(12) United States Patent
Sang et al.

(10) Patent No.: US 10,007,374 B2
(45) Date of Patent: Jun. 26, 2018

(54) TOUCH CONTROL ELASTIC STRUCTURE, PRESSURE DETECTION METHOD AND DISPLAY DEVICE

(71) Applicants: BOE TECHNOLOGY GROUP CO., LTD., Beijing (CN); BEIJING BOE OPTOELECTRONICS TECHNOLOGY CO., LTD., Beijing (CN)

(72) Inventors: Jian Sang, Beijing (CN); Haiwei Sun, Beijing (CN)

(73) Assignees: BOE Technology Group Co., Ltd., Beijing (CN); Beijing BOE Optoelectronics Technology Co., Ltd., Beijing (CN)

( * ) Notice: Subject to any disclaimer, the term of this patent is extended or adjusted under 35 U.S.C. 154(b) by 76 days.

(21) Appl. No.: 15/225,273

(22) Filed: Aug. 1, 2016

(65) Prior Publication Data

US 2017/0262111 A1   Sep. 14, 2017

(30) Foreign Application Priority Data

Mar. 10, 2016   (CN) .......................... 2016 1 0137863

(51) Int. Cl.
*G06F 3/041* (2006.01)
*G06F 3/044* (2006.01)

(52) U.S. Cl.
CPC ............ *G06F 3/0414* (2013.01); *G06F 3/044* (2013.01); *G06F 2203/04102* (2013.01)

(58) Field of Classification Search
CPC .............................. G06F 3/0414; G06F 3/044
See application file for complete search history.

(56) References Cited

U.S. PATENT DOCUMENTS

| 2016/0098107 | A1 | 4/2016 | Morrell et al. |
| 2016/0103496 | A1* | 4/2016 | Degner ................... G06F 3/044 |
| | | | 345/157 |
| 2016/0370908 | A1* | 12/2016 | Kim ....................... G06F 3/044 |
| 2017/0212616 | A1 | 7/2017 | Zou et al. |

FOREIGN PATENT DOCUMENTS

| CN | 105183230 A | 12/2015 |
| CN | 204990247 U | 1/2016 |
| CN | 204990249 U | 1/2016 |
| CN | 205038595 U | 2/2016 |

OTHER PUBLICATIONS

Chinese Office Action in Chinese Application No. 201610137863.2, dated Feb. 14, 2018 with English translation.

* cited by examiner

*Primary Examiner* — Nelson Rosario
*Assistant Examiner* — Scott Au
(74) *Attorney, Agent, or Firm* — Collard & Roe, P.C.

(57) ABSTRACT

A touch control elastic structure, a pressure detection method and a display device are disclosed. The touch control elastic structure is adaptable to be disposed between a cover plate and an internal supporting structure, and includes a force touch base layer, an elastic layer and a force touch sensor layer which are sequentially laminated; the force touch sensor layer is disposed on one side of the elastic layer facing the internal supporting structure, or the force touch base layer is disposed on one side of the elastic layer facing the internal supporting structure.

17 Claims, 2 Drawing Sheets

FIG. 4
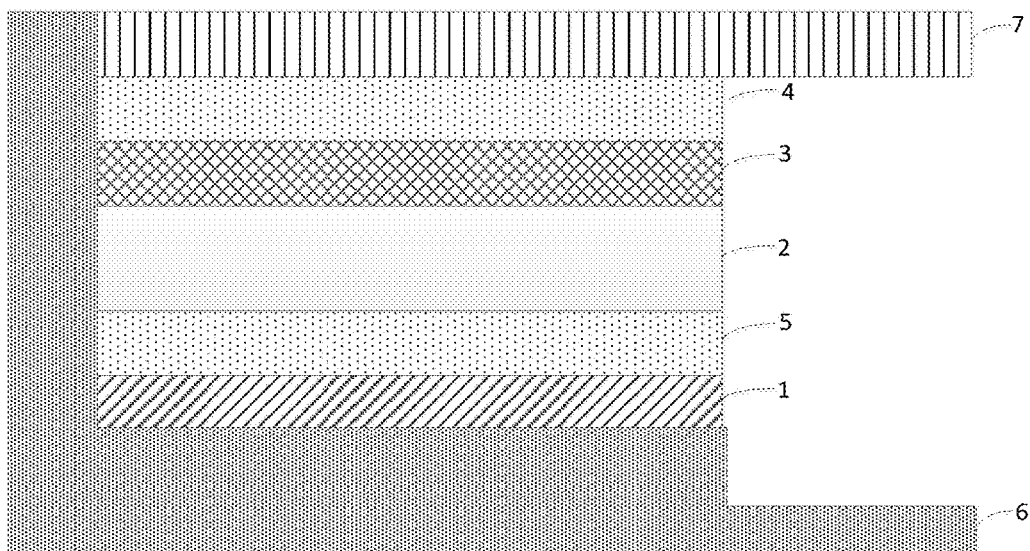
FIG. 5
| Obtaining the capacitance variation between the force touch sensor layer and the force touch base layer when detecting that an external force is applied to the cover plate. |
|---|
↓
| Obtaining the pressure applied to the cover plate according to the capacitance variation. |
|---|
FIG. 6

TOUCH CONTROL ELASTIC STRUCTURE, PRESSURE DETECTION METHOD AND DISPLAY DEVICE

CROSS REFERENCE TO RELATED APPLICATIONS

Applicant claims priority under 35 U.S.C. § 119 of Chinese Application No. 201610137863.2 filed on Mar. 10, 2016, the disclosure of which is incorporated by reference.

TECHNICAL FIELD

Embodiments of the present disclosure relate to a touch control elastic structure, a pressure detection method and a display device.

BACKGROUND

Touch panels have become the main human-computer interaction way for personal mobile communication devices and general information terminals, such as tablet PCs, smart mobile phones and super laptops, due to the advantages of easy operation, visualization, and flexibility. Force touch sensing function is widely applied in products such as touch devices and subsequently may gradually become a standard function of touch devices.

SUMMARY

An embodiment of the present disclosure provides a touch control elastic structure, adaptable to be disposed between a cover plate and an internal supporting structure, comprising a force touch base layer, an elastic layer and a force touch sensor layer which are sequentially laminated; the force touch sensor layer is disposed on one side of the elastic layer facing the internal supporting structure, or the force touch base layer is disposed on one side of the elastic layer facing the internal supporting structure.

Another embodiment of the present disclosure provides a display device, comprising: a cover plate and an internal supporting structure arranged opposite to each other; and a touch control elastic structure being disposed between the cover plate and the internal supporting structure and including a force touch base layer, an elastic layer and a force touch sensor layer which are sequentially laminated; the force touch sensor layer is disposed on one side of the elastic layer facing the internal supporting structure, or the force touch base layer is disposed on one side of the elastic layer facing the internal supporting structure.

Still another embodiment of the present disclosure provides a pressure detection method of the above display device, comprising: acquiring capacitance variation between the force touch sensor layer and the force touch base layer when detecting that an external force is applied to the cover plate; and obtaining the pressure applied to the cover plate according to the capacitance variation.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from the following detailed description.

BRIEF DESCRIPTION OF THE DRAWINGS

In order to clearly illustrate the technical solution of the embodiments of the disclosure, the drawings of the embodiments will be briefly described in the following; it is obvious that the described drawings are only related to some embodiments of the disclosure and thus are not limitative of the disclosure.

FIG. 4 is a schematic structural view of still another touch control elastic structure provided by an embodiment of the present disclosure;

FIG. 5 is a schematic structural view illustrating the bonding configuration of the touch control elastic structure with a cover plate and a central frame in the embodiment as shown in FIG. 4; and FIG. 6 is a flowchart of a pressure detection method provided by an embodiment of the present disclosure.

DETAILED DESCRIPTION

In order to make objects, technical details and advantages of the embodiments of the disclosure apparent, the technical solutions of the embodiments will be described in a clearly and fully understandable way in connection with the drawings related to the embodiments of the disclosure. Apparently, the described embodiments are just a part but not all of the embodiments of the disclosure. Based on the described embodiments herein, those skilled in the art can obtain other embodiment(s), without any inventive work, which should be within the scope of the disclosure.

In general, ways for achieving the force touch sensing function are provided. For instance, pressure detection can be directly achieved by bonding force touch sensors provided on the back of an organic light-emitting diode (OLED) display device, or pressure detection is achieved by adopting a force touch sensor to form a resistive pressure sensor.

In addition, a touch panel and a liquid crystal module (LCM) may be held together by sealant along the peripheral frame region, e.g., bonded together through a foam structure. The foam structure is generally of a circular hollow frame structure and has the function of buffering and dust prevention for the LCM.

Embodiments of the present disclosure provide a new configuration for achieving force touch sensing by combining an elastic structure and a force touch sensor.

Figure 1:
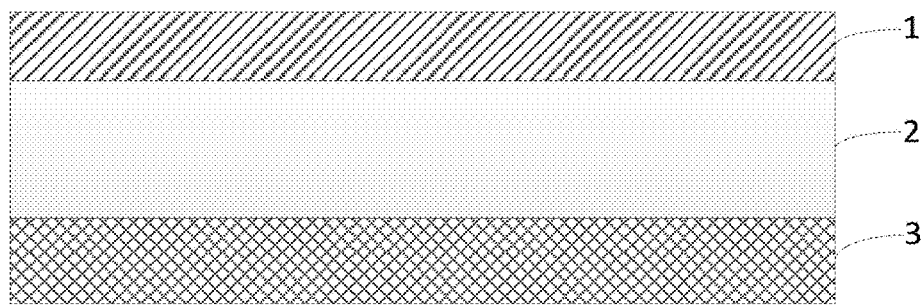
FIG. 1 is a schematic structural view of a touch control elastic structure provided by an embodiment of the present disclosure.

FIG. 1 is a schematic structural view of a touch control elastic structure provided by an embodiment of the present disclosure. As illustrated in FIG. 1, the touch control elastic structure is disposed between a cover plate and a central frame and comprises a force touch base layer 1, an elastic layer (e.g., a foam layer) 2, and a force touch sensor layer 3 which are sequentially laminated. For instance, the cover plate may be a glass cover plate of a display device, and the central frame is a central frame for the display device and is an example of an internal supporting structure. But the embodiment of the present disclosure is not limited thereto. For instance, the cover plate may be any tabular structure facing the user of the display device and has the function of protecting the display device, and the internal supporting structure may be another supporting structure for supporting the touch control elastic structure in the display device, for instance, may be of a plate or a frame. The elastic structure may be formed by an elastic material that is deformable under pressure, for instance, and is provided to surround the internal structure along the periphery of the display device, and for instance, forms a circular hollow frame structure. The elastic structure is, for instance, a foam layer.

The force touch sensor layer 3 is disposed on one side of the elastic layer 2, which side faces the central frame. Or the force touch base layer 1 is disposed on one side of the elastic layer 2, which side faces the central frame.

More specifically, in the embodiment, the thickness of the elastic layer 2 is selected according to the distance between the cover plate and the central frame and also the thickness of the product. But no limitation is given to the thickness in the embodiment of the present disclosure.

As can be seen, in the touch control elastic structure provided by the embodiment, the force touch base layer 1 and the force touch sensor layer 3 are formed on both sides of the elastic layer 2, and a sensing capacitor is formed by the force touch base layer 1 and the force touch sensor layer 3. When the screen is pressed, the pressure applied to the cover plate of the screen is transferred to the elastic structure that is disposed between the cover plate and the central frame and has the fixing function, and the elastic layer 2 is deformed. Thus, the distance between the force touch base layer and the force touch sensor layer 3 is varied, and hence the capacitance provided therebetween changes accordingly. Therefore, the pressure can be detected by way of sensing the changed capacitance, and hence the function of the force touch sensor can be achieved.

Figure 2:
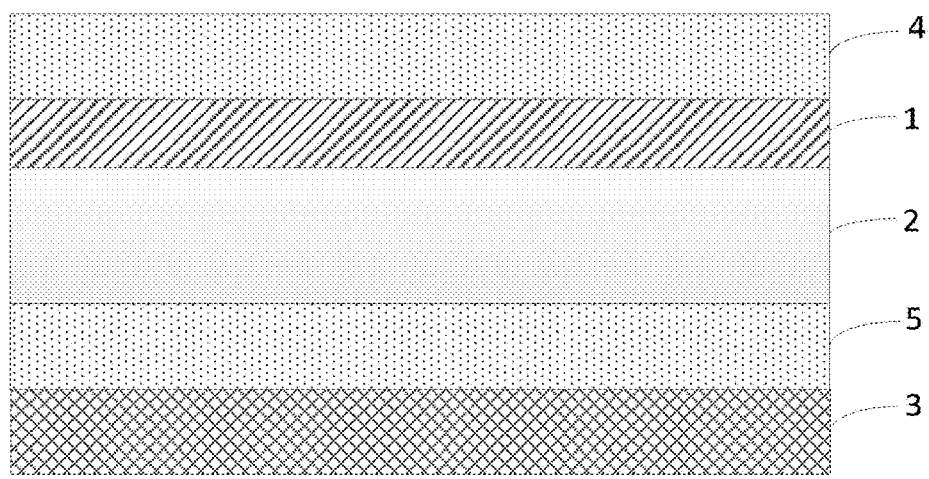
FIG. 2 is a schematic structural view of another touch control elastic structure provided by an embodiment of the present disclosure.

Moreover, as illustrated in FIGS. 2 and 4, the touch control elastic structure further comprises a first insulation layer 4 and a second insulation layer 5. It should be understood that the first insulation layer 4 is configured to bond the touch control elastic structure and the cover plate, and the second insulation layer 5 is configured to bond the touch control elastic structure and the central frame.

FIG. 2 is a schematic structural view of another touch control elastic structure provided by an embodiment of the present disclosure. In the embodiment, the force touch sensor layer 3 is disposed on one side of the elastic layer 2 facing the central frame; the force touch base layer 1 is disposed on one side of the elastic layer 2 facing the cover plate; the first insulation layer 4 is disposed on one side of the force touch base layer 1 facing away from the elastic layer 2; and the second insulation layer 5 is disposed between the elastic layer 2 and the force touch sensor layer 3.

Figure 3:
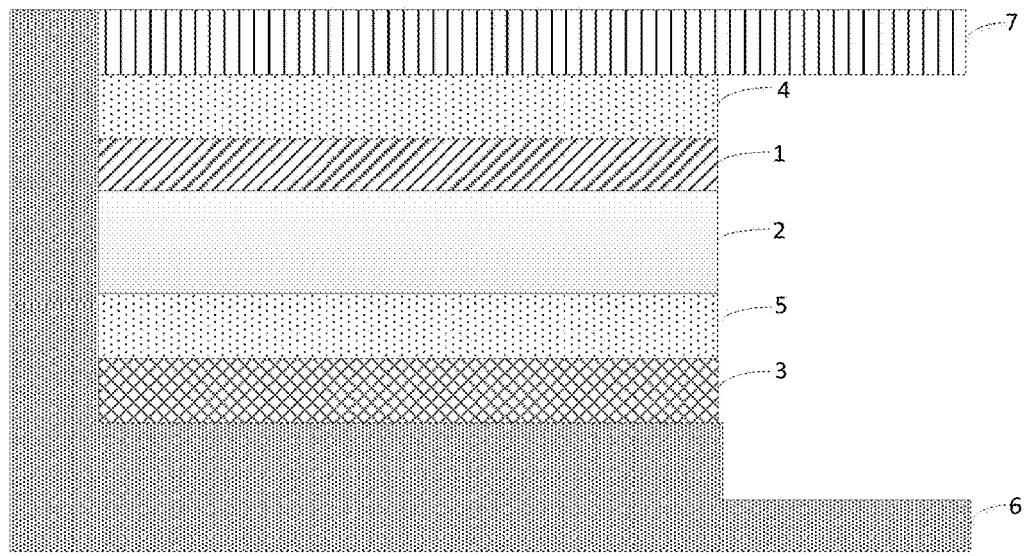
FIG. 3 is a schematic structural view illustrating the bonding configuration of the touch control elastic structure with a cover plate and a central frame in the embodiment as shown in FIG. 2.

For instance, as illustrated in FIG. 3, the first insulation layer 4 is configured to bond the touch control elastic structure and the cover plate 7; the second insulation layer 5 is configured to bond the elastic layer 2 and the force touch sensor layer 3; and the force touch sensor layer 3 is directly integrated on the central frame 6. Moreover, the second insulation layer 5 not only has bonding function but also has planarization function and can well fill gaps or voids on a surface of the elastic layer 2.

It should be noted that the second insulation layer 5 may also be disposed on one side of the force touch sensor layer 3 facing the central frame. Thus, the first insulation layer 4 is configured to bond the touch control elastic structure and the cover plate 7, and the second insulation layer 5 is configured to bond the touch control elastic structure and the central frame.

FIG. 4 is a schematic structural view of still another touch control elastic structure provided by an embodiment of the present disclosure. In the embodiment, the force touch base layer 1 is disposed on one side of the elastic layer 2 facing the central frame; the force touch sensor layer 3 is disposed on one side of the elastic layer 2 facing the cover plate; the first insulation layer 4 is disposed on one side of the force touch sensor layer 3 facing away from the elastic layer 2; and the second insulation layer 5 is disposed between the elastic layer 2 and the force touch base layer.

For instance, as illustrated in FIG. 5, the first insulation layer 4 is configured to bond the touch control elastic structure and the cover plate 7; the second insulation layer 5 is configured to bond the elastic layer 2 and the force touch base layer 1; and the force touch base layer 1 is directly formed on the central frame.

It should be noted that the second insulation layer 5 may also be disposed on one side of the touch force base layer 1 facing the central frame. Thus, the first insulation layer 4 is configured to bond the touch control elastic structure and the cover plate 7, and the second insulation layer 5 is configured to bond the touch control elastic structure and the central frame.

In the embodiment, the first insulation layer 4 may be a double-sided adhesive tape. One surface of the first insulation layer 4 is connected with the force touch base layer or the force touch sensor layer by adhesion, and the other surface is bonded with the cover plate.

In the embodiment, the second insulation layer 5 may be a double-sided adhesive tape. One surface of the second insulation layer 5 is connected with the elastic layer 2 by adhesion, and the other surface is bonded with the force touch base layer or the force touch sensor layer.

It should be noted that the first insulation layer 4 and the second insulation layer 5 may also be another type of adhesive tape and have bonding function. No limitation will be given here in the embodiment.

In the embodiment, the force touch base layer is made from a metallic conductive material or a non-metallic conductive material. Due to the sensing capacitance required to be produced between the force touch base layer and the force touch sensor layer, the force touch base layer is taken as one pole plate of the sensing capacitor and is made from a conductive material. Similarly, the force touch sensor layer is taken as the other pole plate of the sensing capacitor and is also made from a conductive material.

In one preferred embodiment of the present disclosure, the force touch sensor layer is in contact with the central frame. As the force touch sensor layer must be electrically connected with a control circuit board disposed between the cover plate and the central frame, the force touch sensor layer is directly disposed on the central frame, which is favorable to the arrangement of leads between the force touch sensor layer and the control circuit board. Thus, the length of the leads can be reduced, and hence the interference of other structures on the circuit can be avoided.

It should be noted that the force touch base layer may also make contact with the central frame.

FIG. 6 is a flowchart of a pressure detection method of any foregoing touch control elastic structure provided by another embodiment of the present disclosure. As illustrated in FIG. 6, the method comprises the following operations:

S1: acquiring the capacitance variation between the force touch sensor layer and the force touch base layer when detecting that an external force is applied to the cover plate.

For instance, when the external force is applied to the cover plate, the elastic layer is deformed under the action of pressure, so that the distance between the force touch sensor layer and the force touch base layer can change (e.g., reduced), and hence the capacitance between both can change accordingly. For instance, the elastic layer is subjected to compressive deformation under the action of pressure, so that the distance between the force touch sensor layer and the force touch base layer can be reduced. According to the plate electrode formula $C=\varepsilon S/d$, when the distance between the two electrodes of the capacitor is reduced, the capacitance can be increased accordingly.

S2: obtaining the pressure applied to the cover plate according to the capacitance variation.

As can be seen from the above, when the external force is applied to the cover plate, in the embodiment, the pressure applied to the cover plate can be determined by detecting the capacitance variation between the force touch sensor layer and the force touch base layer, so that the touch control elastic structure not only has the function of fixing the cover plate and the central frame but also can detect the pressure and achieve the function of the force touch sensor.

On the basis of same concept, the embodiment of the present disclosure provides a display device comprising any foregoing touch control elastic structure. The touch control elastic structure is disposed between the cover plate and the central frame of the display device. More specifically, the cover plate is bonded with the touch control elastic structure through the first insulation layer in the touch control elastic structure, and the central frame is bonded with the touch control elastic structure through the second insulation layer in the touch control elastic structure.

In the embodiment, the display device may be any product or component with display function such as a liquid crystal display (LCD) panel, a mobile phone, a tablet PC, a TV, a notebook computer, a digital picture frame and a navigator. As the display device is the display device comprising any foregoing touch control elastic structure, the display device can solve same technical problems and achieve same technical effects.

As seen from the above, in the embodiment, the force touch base layer and the force touch sensor layer are respectively formed on both sides of the elastic layer, and the sensing capacitor is formed by the force touch base layer and the force touch sensor layer. When the screen is pressed, the pressure applied to the cover plate of the screen is conducted to the touch control elastic structure being disposed between the cover plate and the central frame and having the fixing function, so that the elastic layer in the touch control elastic structure can be deformed, and hence the sensing capacitor formed between the force touch base layer and the force touch sensor layer can change accordingly. Therefore, the pressure can be detected.

The elastic structure provided by the embodiment of the present disclosure not only has the function of fixing the cover plate and the central frame but also can achieve the function of the force touch sensor by integrating the force touch sensor layer in the elastic structure.

Of course, any product or method provided by the present disclosure is not required to simultaneously have all the above advantages and benefits.

The foregoing is only the preferred embodiments of the present disclosure and not intended to limit the scope of protection of the present disclosure. The scope of protection of the present disclosure should be defined by the appended claims.

The application claims priority to the Chinese patent application No. 201610137863.2, filed Mar. 10, 2016, the disclosure of which is incorporated herein by reference as part of the application.

What is claimed is:

1. A touch control elastic structure, adaptable to be disposed between a cover plate and an internal supporting structure, comprising a force touch base layer, an elastic layer and a force touch sensor layer which are sequentially laminated,
   wherein the force touch sensor layer is disposed on one side of the elastic layer facing the internal supporting structure, or the force touch base layer is disposed on one side of the elastic layer facing the internal supporting structure;
   the touch control elastic structure further comprises a first insulation layer and a second insulation layer, wherein
   in a case where the force touch sensor layer is disposed on one side of the elastic layer facing the internal supporting structure, the first insulation layer is disposed on one side of the force touch base layer facing away from the elastic layer, and the second insulation layer is disposed between the elastic layer and the force touch sensor layer.

2. The touch control elastic structure according to claim 1, wherein the force touch sensor layer is in contact with the internal supporting structure, or the force touch base layer is in contact with the internal supporting structure.

3. The touch control elastic structure according to claim 1, wherein the force touch sensor layer is electrically connected with a control circuit board disposed between the cover plate and the internal supporting structure.

4. The touch control elastic structure according to claim 1, wherein the force touch base layer is made from a metallic conductive material or a non-metallic conductive material.

5. The touch control elastic structure according to claim 1, wherein the internal supporting structure is a central frame.

6. A touch control elastic structure, adaptable to be disposed between a cover plate and an internal supporting structure, comprising a force touch base layer, an elastic layer and a force touch sensor layer which are sequentially laminated,
   wherein the force touch sensor layer is disposed on one side of the elastic layer facing the internal supporting structure, or the force touch base layer is disposed on one side of the elastic layer facing the internal supporting structure;
   the touch control elastic structure further comprises: a first insulation layer and a second insulation layer, wherein
   in a case where the force touch base layer is disposed on one side of the elastic layer facing the internal supporting structure, the first insulation layer is disposed on one side of the force touch sensor layer away from the elastic layer, and the second insulation layer is disposed between the elastic layer and the force touch base layer.

7. A display device, comprising:
   a cover plate and an internal supporting structure arranged opposite to each other; and
   a touch control elastic structure being disposed between the cover plate and the internal supporting structure and including a force touch base layer, an elastic layer and a force touch sensor layer which are sequentially laminated, in which the force touch sensor layer is disposed on one side of the elastic layer facing the internal supporting structure, or the force touch base layer is disposed on one side of the elastic layer facing the internal supporting structure;

the display device further comprises a first insulation layer and a second insulation layer, wherein in a case where the force touch sensor layer is disposed on one side of the elastic layer facing the internal supporting structure, the first insulation layer is disposed on one side of the force touch base layer away from the elastic layer, and the second insulation layer is disposed between the elastic layer and the force touch sensor layer; or in a case where the force touch base layer is disposed on one side of the elastic layer facing the internal supporting structure, the first insulation layer is disposed on one side of the force touch sensor layer away from the elastic layer, and the second insulation layer is disposed between the elastic layer and the force touch base layer.

8. The display device according to claim 7, wherein in a case where the force touch sensor layer is disposed on one side of the elastic layer facing the internal supporting structure, the force touch sensor layer is in contact with the internal supporting structure;

in a case where the force touch base layer is disposed on one side of the elastic layer facing the internal supporting structure, the force touch base layer is in contact with the internal supporting structure.

9. The display device according to claim 7, wherein the force touch sensor layer is electrically connected with a control circuit board disposed between the cover plate and the internal supporting structure.

10. The display device according to claim 7, wherein the first insulation layer is a double-sided adhesive tape.

11. The display device according to claim 7, wherein the second insulation layer is a double-sided adhesive tape.

12. The display device according to claim 7, further comprising: a first insulation layer and a second insulation layer, wherein the cover plate is bonded with the touch control elastic structure through the first insulation layer; and the internal supporting structure is bonded with the touch control elastic structure through the second insulation layer.

13. The display device according to claim 12, wherein the first insulation layer is a double-sided adhesive tape.

14. The display device according to claim 12, wherein the second insulation layer is a double-sided adhesive tape.

15. The display device according to claim 7, wherein the force touch base layer is made from a metallic conductive material or a nonmetallic conductive material.

16. The display device according to claim 7, wherein the internal supporting structure is a central frame.

17. A pressure detection method of the display device according to claim 7, comprising:

acquiring capacitance variation between the force touch sensor layer and the force touch base layer when detecting that an external force is applied to the cover plate; and obtaining the pressure applied to the cover plate according to the capacitance variation.

* * * * *